(12) United States Patent
Carlstedt et al.

(10) Patent No.: US 6,565,073 B1
(45) Date of Patent: May 20, 2003

(54) ELECTROMAGNETIC SUSPENSION SYSTEM

(75) Inventors: Robert P. Carlstedt, Rochester Hills, MI (US); Daniel E. Whitney, Arlington, MA (US); Mark C. Smith, Troy, MI (US); Eric Stephen Geib, Fenton, MI (US); Steven M. Foster, Rochester, MI (US); Richard M. Clisch, Canton, MI (US); Shan Shih, Troy, MI (US); Juan Jose Marcos Munoz, Navara (ES)

(73) Assignee: Meritor Light Vehicle Technology, LLC, Troy, MI (US)

( * ) Notice: Subject to any disclaimer, the term of this patent is extended or adjusted under 35 U.S.C. 154(b) by 0 days.

(21) Appl. No.: 10/124,649

(22) Filed: Apr. 17, 2002

(51) Int. Cl.⁷ .................................................. F16F 1/04
(52) U.S. Cl. ......................... 267/290; 267/168; 188/267
(58) Field of Search .......................... 188/267; 267/168, 267/290, 250, 140.14, 140.13, 140.12

(56) References Cited

U.S. PATENT DOCUMENTS

| | | | |
|---|---|---|---|
| 2,606,021 A | * | 8/1952 | Hexel .......................... 267/290 |
| 3,556,504 A | * | 1/1971 | Sinclair ....................... 267/168 |
| 3,559,976 A | * | 2/1971 | Jerz, Jr. ....................... 267/290 |
| 4,555,126 A | | 11/1985 | Ishimitsu et al. |
| 4,793,599 A | | 12/1988 | Ishioka |
| 4,815,575 A | | 3/1989 | Murty |
| 4,892,328 A | * | 1/1990 | Kurtxzman et al. ........ 188/267 |
| 4,893,800 A | | 1/1990 | Tabata |
| 4,895,355 A | * | 1/1990 | Wolf et al. .................. 267/168 |
| 4,912,343 A | * | 3/1990 | Stuart ........................... 310/14 |
| 5,044,660 A | | 9/1991 | Yamamura et al. |
| 5,069,302 A | | 12/1991 | Kageyama |
| 5,176,368 A | | 1/1993 | Shtarkman |
| 5,269,556 A | | 12/1993 | Heyring |
| 5,273,263 A | | 12/1993 | Freudenberg et al. |
| 5,276,623 A | | 1/1994 | Wolfe |
| 5,277,281 A | | 1/1994 | Carlson et al. |
| 5,431,261 A | | 7/1995 | Olgac |
| 5,551,540 A | | 9/1996 | Forster et al. |
| 5,678,847 A | | 10/1997 | Izawa et al. |
| 5,783,127 A | | 7/1998 | Gross et al. |
| 5,961,104 A | | 10/1999 | Gennesseaux |
| 6,068,249 A | | 5/2000 | Shtarkman |

FOREIGN PATENT DOCUMENTS

JP 2001-280417 A * 10/2001

* cited by examiner

*Primary Examiner*—Matthew C. Graham
*Assistant Examiner*—Mariano Sy
(74) *Attorney, Agent, or Firm*—Carlson, Gaskey & Olds

(57) ABSTRACT

A suspension assembly for a motor vehicle includes a wheel assembly attached to the frame of a motor vehicle for movement in response to uneven roadway surfaces. A first inductive coil attached to the frame is mounted along an axis, and a second inductive coil is mounted co-axially with the first inductive coil and for movement with the wheel assembly. The inductive coils are movable relative to one another along the axis. An electromagnetic force generated by the inductive coils provides spring and dampening forces for the motor vehicle. Further, variation in the inductance between the coils is measurement to determine the relative position between the coils in order to monitor motor vehicle ride height.

17 Claims, 1 Drawing Sheet

ELECTROMAGNETIC SUSPENSION SYSTEM

BACKGROUND OF THE INVENTION

This invention relates to an electromagnetic suspension assembly for a motor vehicle.

Conventional suspension assemblies include fluid filled shock absorbers in combination with coil springs to provide the required spring and dampening forces.

Most conventional suspension assemblies are known as passive suspension assemblies because they can only react to forces input from movement of the wheel assembly.

It is known in the art to improve on such passive suspension systems by including a variable damper assembly. Conventional variable damper assemblies change the dampening force by changing flow orifice sizes or by changing the viscosity of a fluid filled damper by using a magnetorheological fluid. Variable damper assemblies improve the driveability of a motor vehicle by adjusting the dampening force depending on desired vehicle handling characteristics including traction, braking and handling. However, such suspension assemblies still only react to forces input from the wheel assembly.

It is also known in the art to include an electric motor to provide variable dampening characteristics of a suspension system. Typically, such systems utilize an electric motor rotatebly driven by vertical movement of the wheel assembly. A resistance load on the electric motor is varied to adjust and vary dampening characteristics of the damper and thereby the suspension system. However, such systems are generally utilized as an alternate means of utilizing wheel movement to generate electrical power for use in the motor vehicle.

Currently suspension systems react to force input by the wheel assembly and are unable to input forces to improve driveability of the motor vehicle. It is therefore, desirable to develop a suspension system that can both react to input forces from the wheel assembly, and input forces to the wheel assembly to provide improved motor vehicle drivability.

SUMMARY OF THE INVENTION

The invention is a suspension assembly for a motor vehicle including two generally co-axially mounted electromagnetic coils between which is generate a controlled magnetic field adjusted to provide required spring and dampening forces. The suspension assembly includes a wheel assembly movably mounted to the motor vehicle frame such that the wheel assembly moves in a substantially vertical direction in response to uneven roadway surfaces. A first inductive coil attaches to the wheel assembly about an axis, and a second inductive coil mounts co-axially with the first inductive coil and movable relative to the first inductive coil. The coils are electrically coupled to a power source controlled by a vehicle controller. The power source provides electrical power to the inductive coils to produce an electromagnetic force between the inductive coils to provide a dampening force required dampen oscillations of the wheel assembly. The variation in inductance between the coils caused by variation in the relative position of the coils to one another is used to determine a ride height of the motor vehicle.

Further, the generated magnetic force between the two coils provides a means in which force can be input into the suspension assembly instead of merely reacting to forces input from the wheel assembly. The inductive coils may be energized in a manner to increase traction by increasing the force with which the wheel assembly contacts the road surface. This provides the ability to actively control the suspension characteristics as desired to control particular motor vehicle driveability characteristics such as traction, braking and handling.

The suspension assembly of the subject invention both reacts to input forces from the wheel assembly, and inputs forces to the wheel assembly to provide improved motor vehicle drivability.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
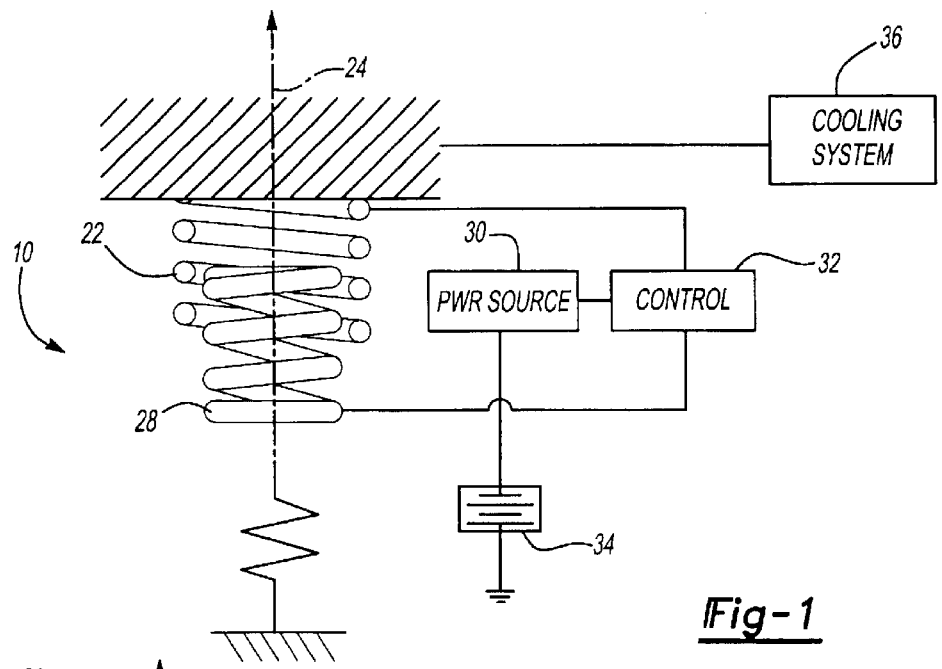
FIG. 1 is a schematic view of the subject suspension system mounted on a motor vehicle.
Figure 2:
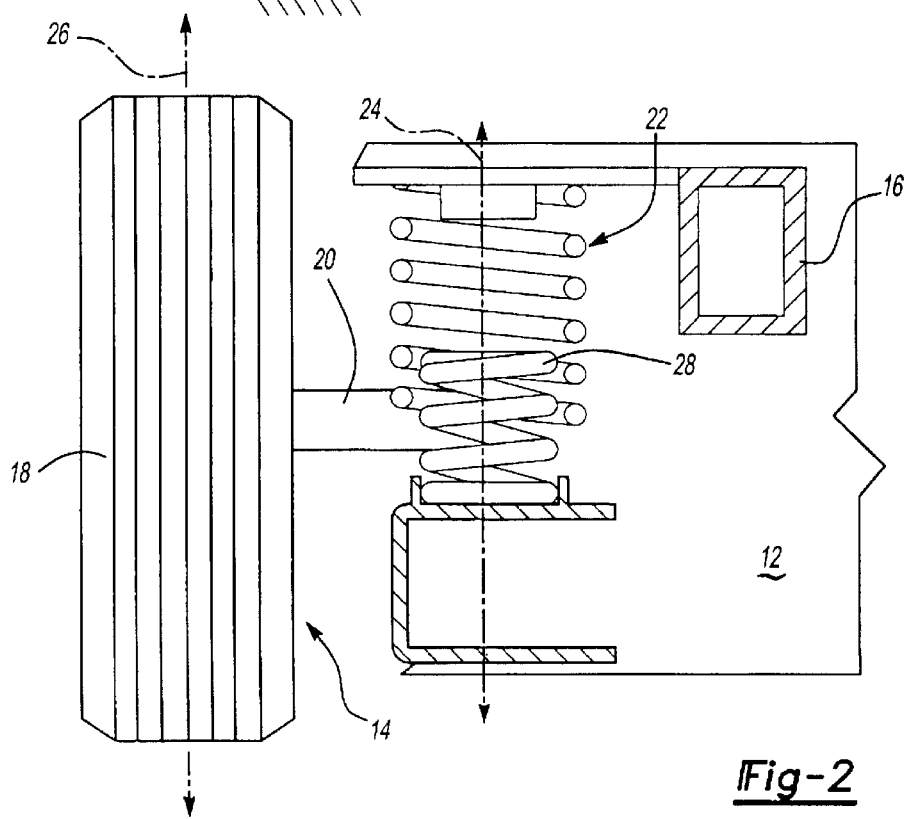
FIG. 2 is a cross-sectional view of the co-axially mounted inductive coils mounted to a motor vehicle.

Referring to the Figures, wherein like numerals indicate like or corresponding parts throughout the several views, the subject invention is a suspension assembly 10 for a motor vehicle 12. Referring to FIGS. 1 and 2, the suspension assembly of the subject invention is includes a wheel assembly 14 attached to a frame 16 of the vehicle 12. Preferably the wheel assembly 14 includes a wheel 18 attached to an axle assembly 20. The axle assembly 20 is movably attached to the frame 16 to allow movement of the wheel assembly 14 in a substantially vertical direction in response to uneven roadway surfaces. The configuration of mounting the wheel assembly 14 to the vehicle shown in FIG. 1 is provided as an example and it should be understood that any configuration for movably mounting a wheel assembly to a vehicle frame is within the contemplation of this invention.

A first inductive coil 22 is mounted to the wheel assembly 14 about a first axis 24 substantially parallel to the vertical axis 26 of movement of the wheel assembly 14. A second inductive coil 28 is mounted co-axially with the first inductive coil 22 and is movable along the axis 24 relative to the first inductive coil 22. A power source 30 is electrically connected to each of the inductive coils 22,28. The power source 30 provides electric power to the inductive coils 22,28 to produce an electromagnetic force therebetween. The electromagnetic force generated between the inductive coils 22,28 controls movement of the wheel assembly 14. Modulating current transmitted to each inductive coil 22,28 varies the force generated between the two coils 22,28 to cause the coils 22,28 to either repel or attract one another. The resulting forces will act to push or pull the two coils 22,28, thereby creating the desired spring and dampening forces in the suspension assembly 10. The electromagnetic force between the inductive coils 22,28 supports the motor vehicle 12 such that during operation, the weight of the motor vehicle 12 is transmitted to the ground through the electromagnetic force between the inductive coils 22,28.

An electronic controller 32 disposed within the motor vehicle 12 controls the power source 30, and the modulation of the current output from the power source 30. The resultant electromagnetic force between the inductive coils 22,28 provides the force path through which the weight of the motor vehicle 12 is transferred to the ground. The electromagnetic force generated and particularly a repelling force between the inductive coils 22,28 provides the required spring and dampening forces for the motor vehicle 12.

The electronic controller 32 adjusts the electromagnetic force by modulating the current applied to each of the inductive coils 22,28. Modulating the current and in turn the electromagnetic force between the inductive coils 22, 28 adjusts the dampening force of the suspension assembly 10. Further, the electromagnetic forces between the inductive coils 22,28 are also varied to optimize motor vehicle traction, braking and steering. The dampening rate, and spring rate of the suspension system 10 varies in response to the changes in electromagnetic force between the coils 22,28 such that optimal spring and dampening rates can be continuously changed in response to driving conditions. The desired forces in response to particular conditions can be determined experimentally for any suspension assembly and motor vehicle.

The subject invention differs from typical conventional suspension systems available in that conventional suspension systems only react to wheel assembly movement caused by road conditions. Conventional system will act to dissipate kinetic energy from the wheel assembly generated by movement of the motor vehicle over uneven roadway surfaces. The subject suspension assembly inputs energy into the suspension assembly to positively move the wheel assembly 14 along the first axis 24.

By inputting energy into the suspension system 10, additional control over traction, braking, and steering characteristics of the motor vehicle 12 is provided.

The electronic controller 32 may also be used to determine the instantaneous vehicle ride height. By inputting a high frequency electrical signal to the inductive coils 22,28 and sensing a variation in inductance between the coils 22,28, a relative position between the two inductive coils 22,28 is determined and thereby the current ride height of the motor vehicle 12. Further, by measuring relative position of inductive coils 22,28 at all corners of the vehicle and comparing those relative positions with each other the vehicle dynamic position along multiple axes can be determine to monitor vehicle yaw, pitch and roll. The dynamic position of the vehicle 12 can be monitored continuously at all wheels 18 to provide information to the electronic controller 32 such that the electromagnetic force at each wheel assembly 14 can be adjusted to attain desired dampening characteristic for the vehicle 12 given current vehicle position.

Relative movement between the inductive coils 22,28 can be used for the generation of electricity. Moving electromagnetic inductive coils 22,28 relative to one another can generate an electric current. The electronic controller 32 can be connected to the moving inductive coils 22,28 and also to a battery 34 disposed within the motor vehicle 12 such that electricity produced by relative movement between the inductive coils 22,28 is directed by the electronic controller to charge the battery 34. A worker in the electronic arts will be able to provide appropriate controls to achieve these goals.

The subject invention may also be practiced utilizing a permanent magnet and a single inductive coil. Current through the single inductive coil is modulated to repel or attract relative to the permanent magnet.

The inductive coils 22,28 are preferably fabricated in part or in whole from a material having low electrical resistance properties to minimize energy loss in the suspension assembly. Preferably the inductive coils 22,28 are fabricated from a super-conductive material. Super-conductive materials currently available perform optimally at lower temperatures. In another embodiment of the subject invention the suspension assembly includes a cooling system 36 to maintain the super-conductive material forming the inductive coils 22,28 at an optimal operating temperature.

The subject invention includes a method of controlling the suspension assembly for a motor vehicle 12. The method includes the steps of generating an electromagnetic force between the inductive coils 22,28 and adjusting the electromagnetic force between the inductive coils 22,28 to control movement of the wheel assembly 14. Adjusting the electromagnetic force between the inductive coils 22, 28 to either push or pull against each other and thereby create the required spring and dampening forces controls movement of the wheel assembly 14. The relative position between the inductive coils 22,28 is determined by measuring the variation in induction between the coils 22,28 relative to the position of the inductive coils 22,28. Vehicle dynamic characteristics such as yaw, pitch and roll are monitored by measuring the relative variation in inductance between the two coils 22,28 caused by a change in relative position between the two inductive coils 22,28. Adjustment of the electromagnetic force provides for a variable dampening of wheel assembly oscillation. The adjusting step is further defined by adjusting the electromagnetic force between the inductive coils 22,28 to adjust the ride height of the motor vehicle 12.

The subject invention may also be practiced utilizing a permanent magnet and a single inductive coil. Current through the single inductive coil is modulated to repel or attract against the permanent magnet.

The foregoing description is exemplary and not just a material specification. The invention has been described in an illustrative manner, and should be understood that the terminology used is intended to be in the nature of words of description rather than of limitation. Many modifications and variations of the present invention are possible in light of the above teachings. The preferred embodiments of this invention have been disclosed, however, one of ordinary skill in the art would recognize that certain modifications are within the scope of this invention. It is understood that within the scope of the appended claims, the invention may be practiced otherwise than as specifically described. For that reason the following claims should be studied to determine the true scope and content of this invention.

What is claimed is:

1. A suspension assembly for a motor vehicle comprising;
    a wheel assembly moveable relative to the motor vehicle
    a first coil mounted to said wheel assembly about an axis;
    a second coil mounted generally co-axially with said first coil and movable along said axis relative to said first coil; and
    a power source electrically connected to provide electrical energy to one of said coils to produce an electromagnetic force between said first and second coils to control movement of said wheel assembly.

2. The assembly of claim 1, wherein said power source is electrically connected to both of said coils.

3. The assembly of claim 1, further including a controller to govern said electromagnetic force between said coils.

4. The assembly of claim 3, wherein said controller senses variation in inductance between said coils based on a relative position between said coils to measure dynamic characteristics of the motor vehicle.

5. The assembly of claim 3, wherein said controller includes an electrical connection to a battery and relative movement between said coils produces electricity directed by said controller to charge said battery.

6. The assembly of claim 3, wherein said controller varies said electromagnetic force to change the dampening rate of the suspension assembly.

7. The assembly of claim 3, wherein said controller varies said electromagnetic force to optimize motor vehicle traction.

8. The assembly of claim 3, wherein said controller varies said electromagnetic force to optimize steering of the motor vehicle.

9. The assembly of claim 3, wherein said controller varies said electromagnetic force between said coils to optimize braking of the motor vehicle.

10. The assembly of claim 1, wherein said motor vehicle is supported by said electromagnetic force between said coils such that during operation the motor vehicle weight is transmitted to the ground through said electromagnetic force between said coils.

11. The assembly of claim 1, wherein said coils are fabricated from a super-conductive material, and the suspension assembly further includes a cooling system to maintain optimal temperature of said coils fabricated from said super-conductive material.

12. The assembly of claim 1, wherein one of said coils is fabricated from a permanently magnetic material.

13. A method of controlling a suspension assembly for a motor vehicle including a wheel assembly movable along an axis, a first coil attached to said motor vehicle along said axis and a second coil attached to said wheel assembly and co-axially to said first coil for movement along said axis, said method including the steps of:

generating an electromagnetic force between said coils;

adjusting said electromagnetic force between said coils to control movement of said wheel assembly.

14. The method of claim 13, including the step of determining a relative position between said coils based on a variation of induction between said coils to monitor motor vehicle dynamics.

15. The assembly of claim 13, wherein said step of adjusting said electromagnetic force between said coils is further defined by adjusting said electromagnetic force to dampen oscillation of said wheel assembly.

16. The assembly of claim 13, wherein said step of adjusting said electromagnetic force between said coils is further defined by adjusting said electromagnetic force between said coils to adjust a ride height of said motor vehicle.

17. The assembly of claim 13, wherein said step of adjusting said electromagnetic force between said coils is further defined by adjusting said electromagnetic force between said coils to optimize motor vehicle traction, braking and handling.

* * * * *